United States Patent [19]
Hong

[11] Patent Number: 6,052,628
[45] Date of Patent: Apr. 18, 2000

[54] METHOD AND SYSTEM FOR CONTINUOUS MOTION DIGITAL PROBE ROUTING

[76] Inventor: Jaiwei Hong, 167 Carrol St., 3rd Floor, Brooklyn, N.Y. 11231

[21] Appl. No.: 09/109,972

[22] Filed: May 28, 1998

Related U.S. Application Data

[60] Provisional application No. 60/055,230, Aug. 8, 1997.

[51] Int. Cl.[7] ................................................. G06F 19/00
[52] U.S. Cl. ........................... 700/195; 700/161; 700/163
[58] Field of Search ........................ 395/500.13, 500.14, 395/500.15; 700/56, 61, 63, 64, 161, 188, 195, 160, 163; 702/94, 95, 167, 168

[56] References Cited

U.S. PATENT DOCUMENTS

| | | | |
|---|---|---|---|
| 4,153,998 | 5/1979 | McMurtry | 33/556 |
| 4,270,275 | 6/1981 | McMurtry | 33/561 |
| 4,370,721 | 1/1983 | Berenberg et al. | 700/195 |
| 4,835,718 | 5/1989 | Breyer et al. | 700/302 |
| 4,866,643 | 9/1989 | Dutler | 702/168 |
| 4,958,293 | 9/1990 | Tanaka et al. | 700/161 |
| 5,016,199 | 5/1991 | McMurtry et al. | 702/152 |
| 5,025,362 | 6/1991 | Darlington et al. | 700/63 |
| 5,040,931 | 8/1991 | Spivey et al. | 408/185 |
| 5,175,689 | 12/1992 | Matsushia et al. | 700/187 |
| 5,189,806 | 3/1993 | McMurtry et al. | 33/503 |
| 5,208,763 | 5/1993 | Hong et al. | 702/95 |
| 5,333,386 | 8/1994 | Breyer et al. | 33/1 M |
| 5,334,918 | 8/1994 | McMurtry et al. | 318/568.16 |
| 5,428,548 | 6/1995 | Pilborough et al. | 700/195 |
| 5,448,505 | 9/1995 | Novak | 702/170 |
| 5,471,406 | 11/1995 | Breyer et al. | 702/168 |
| 5,491,638 | 2/1996 | Georgi et al. | 700/145 |
| 5,724,264 | 3/1998 | Rosenberg et al. | 702/153 |
| 5,737,244 | 4/1998 | Ruck | 702/154 |

FOREIGN PATENT DOCUMENTS

| | | |
|---|---|---|
| 0390342 | 10/1990 | European Pat. Off. . |
| 284808 | 3/1990 | Japan . |

OTHER PUBLICATIONS

LK—Camio Sales Documentation, May 21, 1997.
Centroid Brochure, Dec. 10, 1996.
Renishaw Digitial Probe Literature, 1989, Section entitled "Principles of Use".

*Primary Examiner*—William Grant
*Assistant Examiner*—Chad Y. Rapp
*Attorney, Agent, or Firm*—Eliot S. Gerber

[57] ABSTRACT

A method and system for routing a digital probe which signals either a triggered or non-triggered state to continuously scan a part surface without having to return to a rest position each time the probe is triggered. The probe is carried by manufacturing equipment capable of moving in response to control signals and providing manufacturing equipment feedback signals indicating the current position of the probe. Continuous movement of the digital probe is achieved by testing the probe to determine if it is triggered or not at a series of closely spaced time intervals, and rotating a move vector (corresponding to desired probe velocity) in each computation cycle to alter the probe trajectory as a function of the operating state of the probe and its position during the previous computation cycle. These techniques allow relatively inexpensive digital probing systems to gather data at speeds comparable to those of much more expensive analog systems. Various computation algorithms for altering the move vector are possible, including increasing or decreasing one component of the move vector by a constant value depending on whether the probe is triggered or not. Another algorithm generates a spiral path around the position of the probe at the previous transition between the triggered and untriggered operating state.

50 Claims, 7 Drawing Sheets

METHOD AND SYSTEM FOR CONTINUOUS MOTION DIGITAL PROBE ROUTING

This application claims benefit of U.S. Provisional Application Ser. No. 60/055,230, filed Aug. 8, 1997.

FIELD OF TECHNOLOGY

This invention relates to collection of surface configuration and position data from physical objects, and more particularly, to a method and system for routing a digital data gathering device which may be utilized to automatically obtain surface data from physical objects with speed and efficiency currently unattainable with conventional techniques. The invention is of particular utility for data collection as it relates to the processes of part localization, inspection and digitizing of part models or templates in connection with computer controlled design and manufacturing, and will be described in that context.

BACKGROUND AND PRIOR ART

The need to measure surface geometry and position of objects for part setup, refixturing, digitizing (i.e., converting a part model into a numerical description), machining, inspection and qualification has resulted in the development of probes and probe routing systems and techniques to automatically scan the surface of an object. These are often used in connection with multipurpose manufacturing equipment such as computer numerically controlled (CNC) machine tools or with dedicated manufacturing equipment such as coordinate measuring machines (CMM). Surface data is obtained by moving a probe relative to the surface being inspected along three orthogonal axes under computer control and sampling both the probe output and probe position data at regular intervals. The samples are used to generate a profile of the part surface, and may also be used to issue probe-routing signals to control the probe trajectory.

Probes used in such systems may be characterized as either digital or analog. Digital probes, also known as on/off contact probes, provide discrete output signals indicating whether or not a threshold value associated with the probe has been crossed; when the threshold value is exceeded, the probe is said to be "triggered." Most digital probes utilize a threshold based on a position displacement (so-called "touch trigger probes"), but force and pressure effects may also be used.

Touch trigger probes have a stylus connected to a sensitive switch which operates when the stylus is displaced from its non-triggered to its triggered position. Because the control system will generally not be able to stop probe fixture motion instantaneously upon contact of the probe with the part surface, the probe is designed to be capable of a certain degree of overtravel beyond the triggered position. The maximum allowable displacement of the device (i.e. the permitted limit of overtravel) is often referred to as its safe operating distance or safe operating range.

A data gathering cycle is typically initiated with the probe in its non-triggered or rest state. The main processor issues control signals to the probe positioning driver subsystem instructing it to decrease the distance between the surface to be measured and the probe. Motion continues until the probe contacts the surface. The triggered state signal from the probe is then used to stop motion of the probe. The control system then signals the positioning driver to return the probe to its rest position and the data gathering process repeats itself.

The change in status of the probe from the non-triggered to the triggered state and position feedback from the probe positioning driver is used by the control system to generate sampled data point in three dimensions. A complete set of data points representing the surface of the part is created as the probe is routed along the part surfaces by either moving the probe along a pre-determined path or by computing the path based on probe output data. One device of the latter type is shown in Hong et al. U.S. Pat. No. 5,208,763.

The iterative cycle of positioning, moving, stopping and sampling, as practiced by the prior art, can be quite time consuming for a large or complex part, as presently available equipment typically can generate only 1–2 data points per second—or in the newest systems, 4–5 points per second. Thus, digital probing systems have been impractical up to now for rapid collection of large data sets.

To address this deficiency of digital probes, analog probes were developed. Analog probe systems provide continuous sensor feedback signals indicating the instantaneous magnitude and direction of the displacement, force, pressure or other measurable effects. The control system uses the sensor feedback to issue control signals to move the probe along a path which keeps the sensor feedback within a predefined operating range. While motion is taking place, the control system combines instantaneous probe position feedback data with the instantaneous analog sensor feedback data to generate the sampled data points. This allows sampled data points to be generated without the need to stop and initialize the probe between readings.

Unfortunately, the increased sophistication of analog probes over their digital counterparts makes them substantially more costly. Also, much more sophisticated electronics is required to coordinate the sampling times between the sensor feedback and the probe driver. As a result, analog probing systems are much more expensive than digital systems, and even though they are much faster, have proved to be of limited utility. It is clear that there would be substantial advantages to a digital probing system having the data gathering speeds of the much more expensive analog systems.

Accordingly, it is an object of this invention to provide improved methods and equipment for collection of surface configuration and position data, and more particularly, from part models, templates or the like in connection with computer controlled design and manufacturing.

It is also an object of this invention to provide such improved methods and equipment using digital touch trigger probes.

It is a further object to provide data collection capability using digital touch trigger probes which could only be achieved up to now using analog probes.

It is a further object of this invention to provide a method and system for routing a digital data gathering device which may be utilized to automatically obtain surface data from physical objects with speed and efficiency previously attainable only through use of much more expensive analog devices.

SUMMARY OF INVENTION

The present invention achieves the desired improvements in digital probing technology by repeatedly sampling the state of the probe (i.e., triggered or not triggered) and its instantaneous position and by continuously controlling the probe trajectory on the basis of the sampled data. The sampling intervals and the computation algorithm are selected in accordance with this invention to assure that the safe operating range for the probe is never exceeded. This permits the probe to remain continuously in motion and obviates the need to return it to its rest position each time it comes in contact with the part surface.

Several computation algorithms are possible. Among these is one by which a probing plane is defined in an orthogonal coordinate system and the probe trajectory is modified after each computation by increasing or decreasing one component of the of the vector which defines the path of the probe in the probing plane by a constant value, while maintaining the other component in that plane at a constant value. The constant value is added whenever the probe is triggered, and subtracted when it is not triggered, or vice-versa.

With another preferred computation algorithm, the path vector is redefined at each computation time such that the probe moves in a spiral path relative to its location at the time of the last transition of the probe in either direction between the triggered and untriggered operating states. The path direction may be clockwise if the probe is triggered and counterclockwise if it is not triggered, or vice-versa.

To maximize the accuracy and speed of data collection, the machine servo loop is "probe-aware", i.e. the computation determining the probe's new trajectory occurs at the servo control loop level. Typically, this allows new commands to the servo motors every 5 milliseconds or less. However, satisfactory operation within the scope of this invention is also achieved if the trajectory is computed outside of the servo level, but this permits new trajectory commands to be computed only at longer time intervals such as every 100 milliseconds.

A system operating in response commands every 100 milliseconds requires slower probe movement since a factor determining the magnitude of the velocity is the maximum distance that may be traversed in one computation cycle compared to the safe operating range of the probe. Nothing precludes the use of even longer time intervals between computation cycles, but the benefit of this invention over conventional approaches diminishes as the cycle time increases.

With the present invention, data collection at a rate of 25–35 points per second is routinely possible, proving performance comparable to that of an analog system, but at a fraction of the cost.

DETAILED DESCRIPTION OF THE PREFERRED EMBODIMENT

A preferred embodiment of the present invention utilizes a computer numerically controlled (CNC) milling machine tool to move a digital displacement probe (typically referred to as a touch-trigger probe) around the part from which surface data is to be obtained. Such an embodiment can be sold as an accessory with suitable hardware and software for existing installations as CNC machines are typically controlled by personal computers or are equipped with processor subsystems and can be readily programmed to perform the functions according to the present invention. The techniques for this are well known, and are omitted in the interest of brevity. Alternatively, the required software can be incorporated into the original programming of the machine and the probe delivered with the machine as sold. Of course, the invention can be embodied in a dedicated machine as well.

Figure 1:
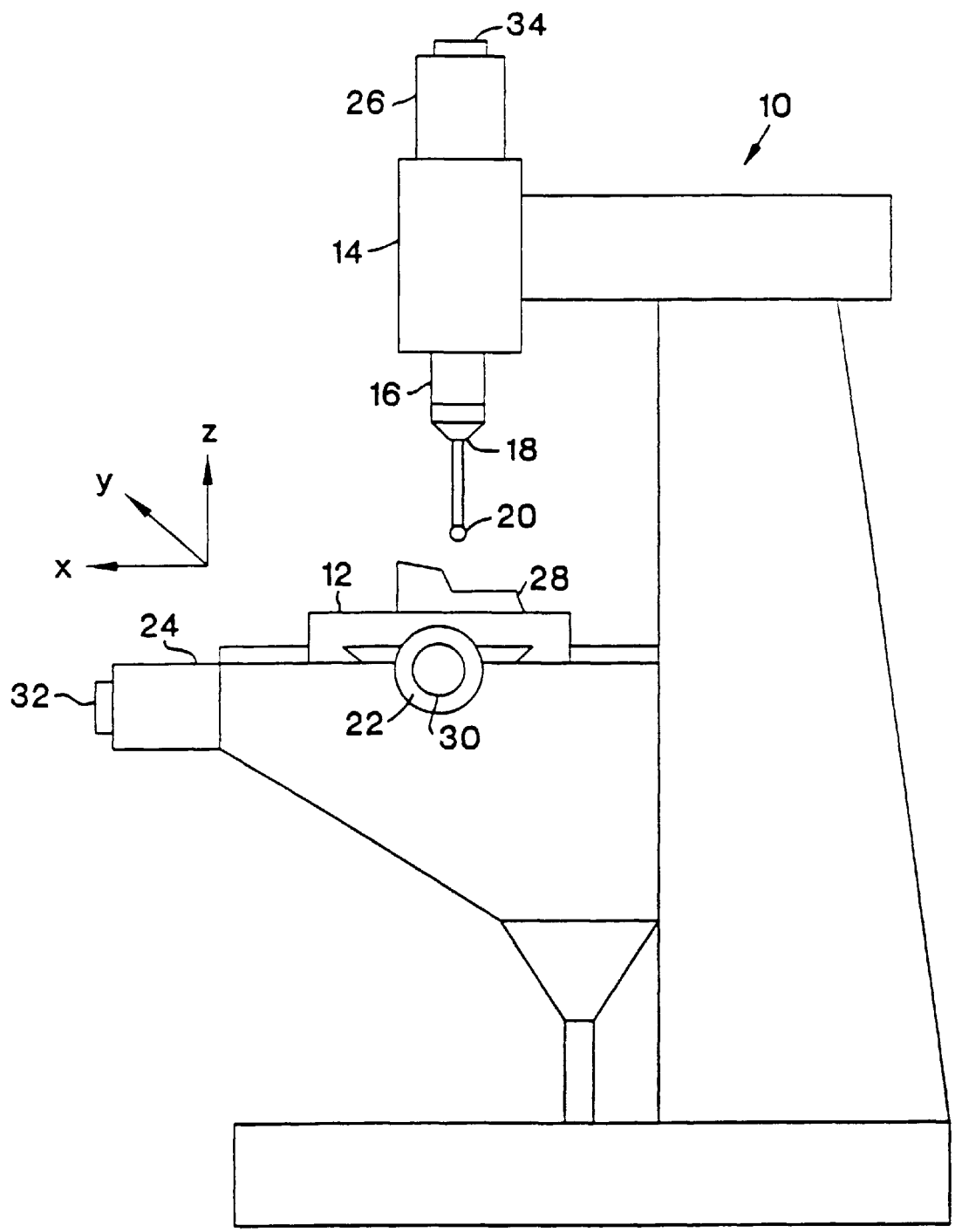
FIG. 1 shows a schematic representation of a machine equipped with a digital probe.

Referring now to FIG. 1, a conventional CNC machine tool 10 has a table 12 movable relative to the head 14 in the X,Y plane. A quill 16 provides motion in the Z direction establishing an orthogonal X, Y, Z Cartesian coordinate system. A touch-trigger probe 18 having a stylus 20 is attached to quill 16. Motors 22 and 24 control motion of table 12 in the X and Y directions, respectively, while motor 26 controls the Z-direction motion of quill 16. A part 28 (whose position relative to machine 10 and/or surface geometry is to be determined) is secured to table 12 in any convenient manner.

Encoders 30, 32 and 34 provide feedback indicating the position of probe 18 with respect to the coordinate system of the CNC machine tool 10. A suitable switch incorporated in probe 16 (not shown) signals whether the probe is triggered (indicating that the stylus 20 is in contact with the surface of part 28) or in its rest or non-triggered state.

As indicated above, in a preferred embodiment, the probe and associated hardware and software are sold as accessories for existing equipment. A representative installation might be on a Hurco KMP3 milling machine manufactured by Hurco Companies, Inc. of Indianapolis, Ind. Such a machine may be fitted with a controller employing a x486 processor with 8 megabytes of memory, and running the Microsoft Windows 95 operating system, and a servo transducer 5-axis PCB Assembly such as Hurco part no. 415-0622-001) to acquire relative position feedback and to provide table and quill drive control signals.

In the preferred implementation, a type MP11 touch trigger probe from Renishaw Inc. of Schaumburg Ill. was used, along with a PCL-725 Relay Actuator & Isolated D/I Card from Advantech America of Sunnyvale, Calif. for acquiring probe status signals. One skilled in the art will readily understand that other types of manufacturing equipment or other types of digital probes and interface cards could be used as well.

Figure 2:
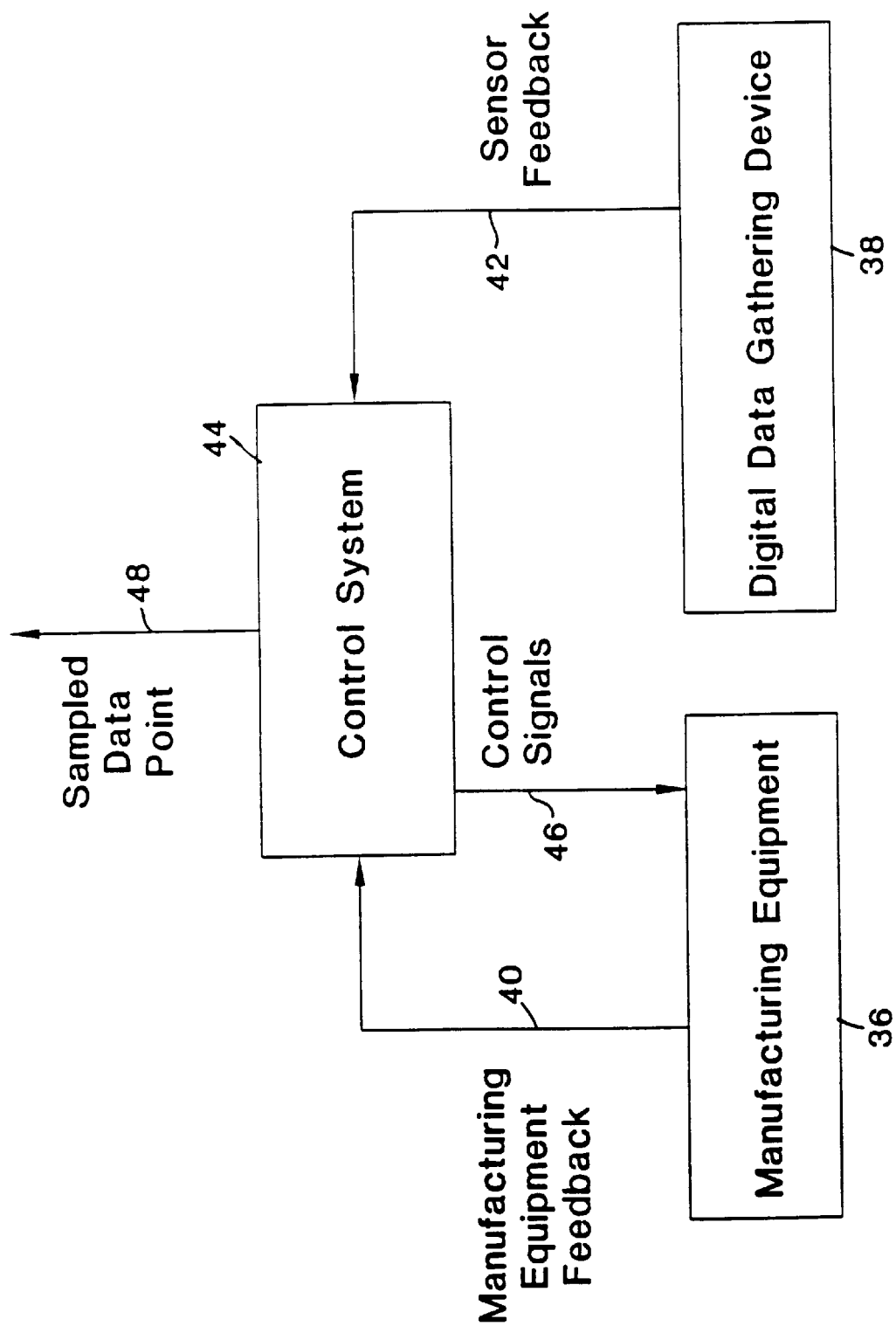
FIG. 2 is block diagram illustrating the functional components and interfaces of the system of the present invention.

Operation of the system of FIG. 1 may be understood from the block diagram shown in FIG. 2. Here, manufacturing equipment 36 corresponds to CNC machine tool 10 shown in FIG. 1, and the digital data gathering device 38 corresponds to touch-trigger probe 18 and the associated signal conversion hardware. Manufacturing equipment feedback is provided by a data path 40, and represents the position signals generated by the encoders 30, 32 and 34 in FIG. 1. Probe signals are provided over data path 42. Control system 44 represents the suitably programmed central processor of the machine tool; this functions to process the feedback information from signal paths 40 and 42 to map the instantaneous relative position of the probe as a data point when the probe switches between it non-triggered and triggered states. This data point is then processed to compute the actual part surface data, which may be delivered on signal path 48 for storage. The data point information is also used to define a move vector, in accordance with which, control signals are issued over signal path 46 are used by manufacturing equipment 36 for operating motors 22, 24 and 26 (see FIG. 1). In a preferred embodiment, the composite move vector represents the relative speed of the digital probe along the X, Y and Z coordinates of the CNC machine tool respectively.

Figure 3:
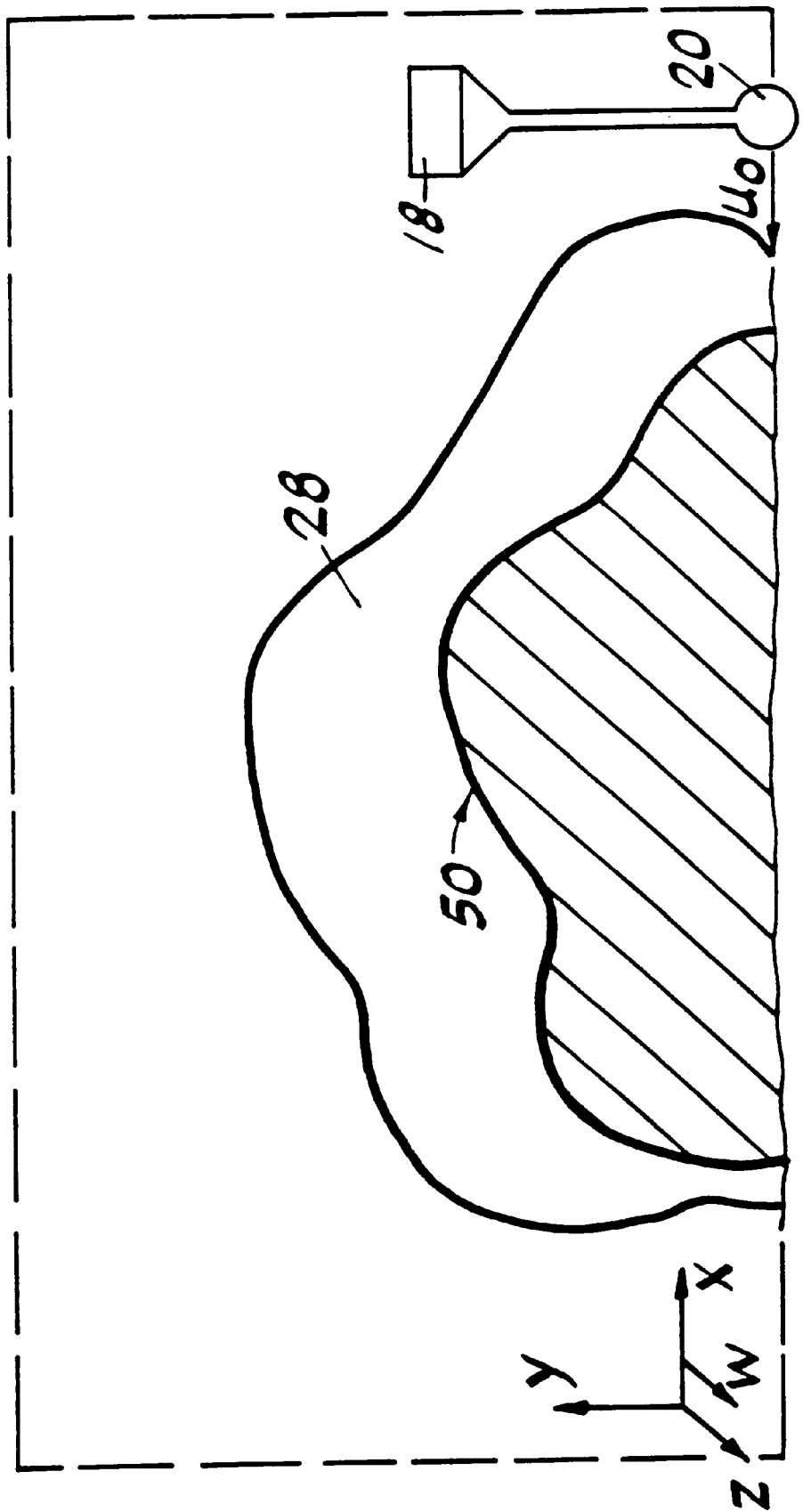
FIG. 3 is an illustrative figure of how the instantaneous probing plane is used to route the probe.

Referring now to FIG. 3, routing of probe 18 along the surface of part 28 begins with the selection of an arbitrary instantaneous probing plane by the control system 44 (FIG. 2), which passes through the position of the probe at the time, and intersects part surface 28. To simplify the description, it will be assumed that the instantaneous probing plane is further restricted by selecting a constant normal vector W throughout the entire probing cycle being illustrated.

The intersection of the probing plane and part 28 defines the routing boundary 50 along which the actual surface data will be computed from the sampled data points. In FIG. 3, the W vector is shown parallel to the Z-axis (i.e., the probing plane is selected to coincide with the X-Y plane) as a matter of convenience, but it should be understood that this is not necessary, and in fact by changing the orientation of the W vector in a systematic or random fashion, using either a computer program executed by control system 44 or instantaneous input from a user manipulating an input device such as a joy stick, complex routing boundaries may be generated to rapidly sample the entire surface of part 28.

As will be appreciated, the microprocessor in the machine control system is capable of many iterations of the computation cycle per second, but because the invention does not require a complex series of computations, processor speed is not a limiting factor. This allows use of the invention even with older CNC machine tools.

After its initial contact with the part surface 28, there commences a series of computation cycles during which the probe is moved on the instantaneous probing plane according to the following trajectory definition rules: (1) if the probe is in its non-triggered state, it is moved in a counter-clockwise direction with respect to the normal W of the instantaneous probing plane according to some function designed to bring stylus 20 into contact with the part; (2) if the probe is in its triggered state, it is moved in a clockwise direction with respect to the normal of the instantaneous probing plane according to some function which returns the stylus to its rest position and guarantees that it remains within the safe operating range.

Numerous functions exist for generating the desired clockwise and counter clockwise rotations, two of which are detailed below in connection with FIGS. 6 and 8. As will be shown, rules (1) and (2) globally route the probe around the part along the routing boundary 50 in the counter clockwise direction relative to the normal W of the instantaneous probing plane. It should be understood, however, that the selection of the counterclockwise and clockwise directions in rules (1) and (2) can be reversed; reversing the directions would globally route the probe in a clockwise direction around the part along routing boundary 50 relative to W.

Figure 4:
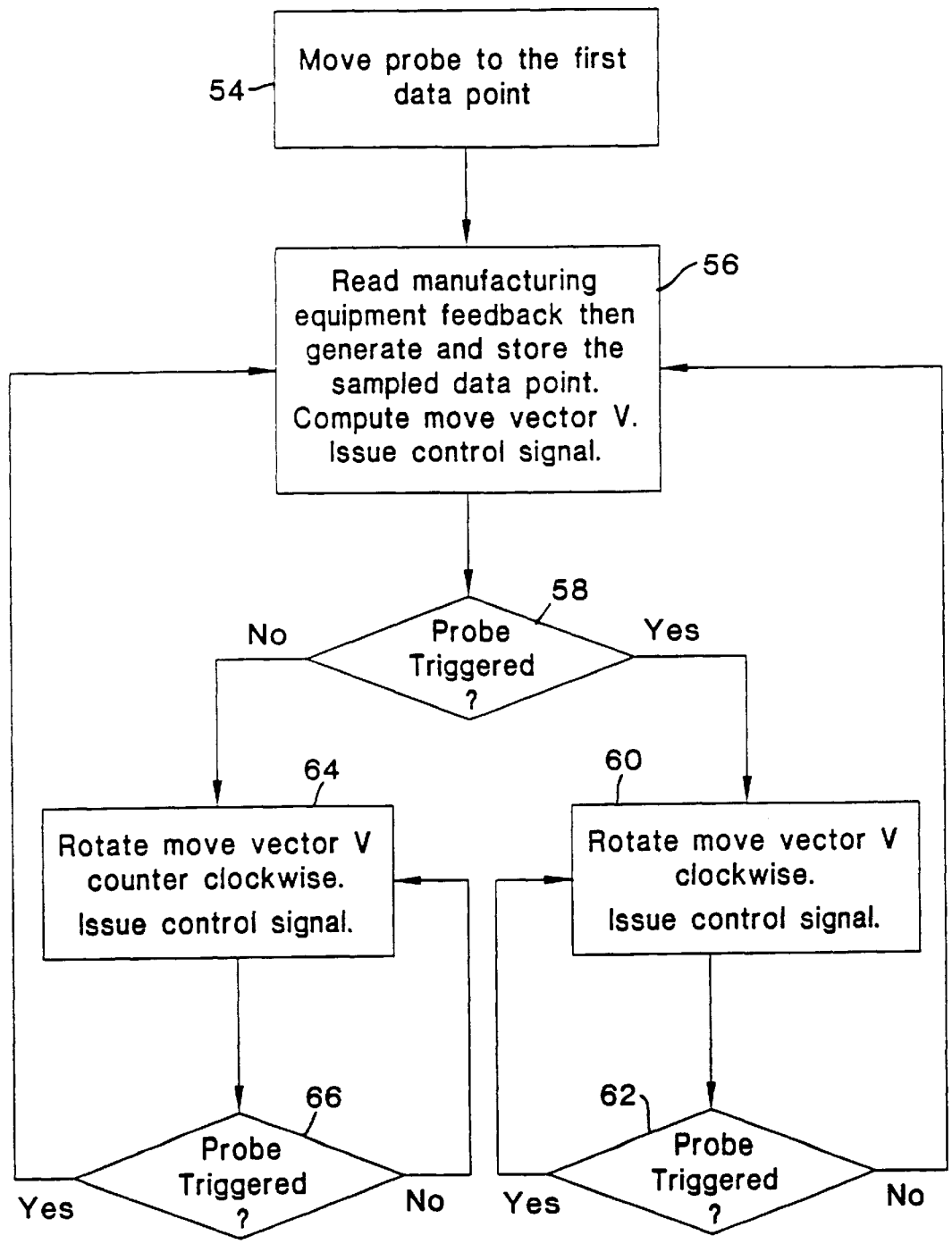
FIG. 4 is a flow chart illustrating a preferred implementation of the probing method of the present invention.
Figure 5:
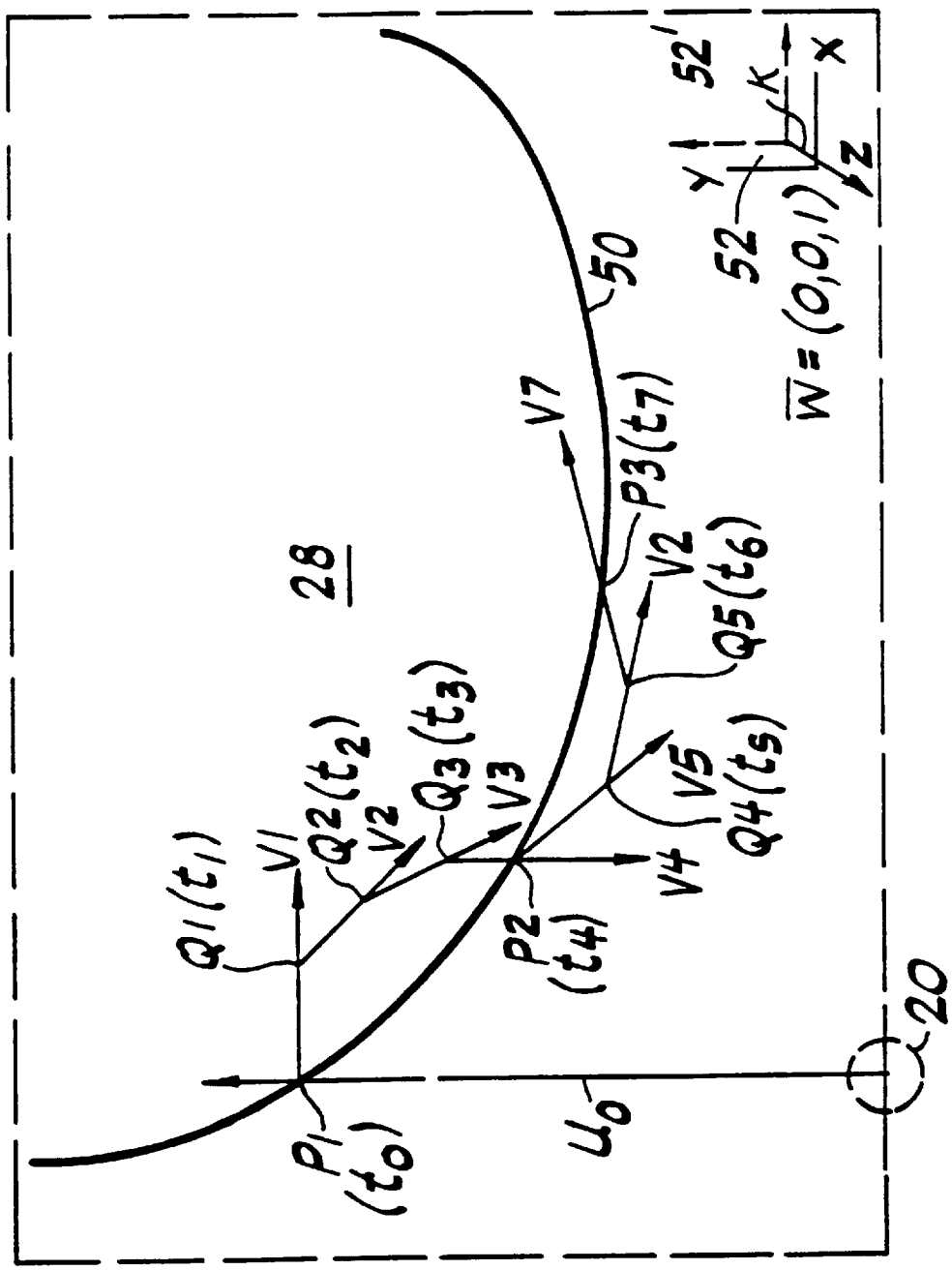
FIG. 5 illustrates the probing operation of a system according to FIG. 4.

FIG. 4 is a flow diagram which illustrates the operation of this invention according to the previously stated routing rules, while FIG. 5 is a schematic representation of the resulting probe trajectory. In FIG. 5, it is again assumed that the X-Y plane has been arbitrarily selected as the instantaneous probing plane 52 and its normal direction is defined by W=(0,0,1). The intersection of the instantaneous probing plane 52 and the part 28 defines the routing boundary 50.

Referring to FIGS. 4 and 5, a sequence of eight computation cycles (beginning at times $t_0, t_1 \ldots t_7$) are illustrated. At block 54 of FIG. 4, the probe is moved toward the part until the stylus 20 is brought into contact with the surface of part 28 either manually, or by some other conventional method along an initial path $U_0$. At block 56, corresponding to a time $t_0$, a sampled data point P1 is created from the probe position feedback and an initial move vector is selected. The selection of the move vector in block 56 is such that it is parallel to the line segment connecting the last sampled data point with the current probe position. In its initial contact with the surface, where there is no "last" sampled data point, the move vector is selected to be the cross product of $U_0$ and W. The magnitude of this vector is set according to some advantageous feedrate, such that the probe will remain within its safe operating range. The initial move vector, depicted in FIG. 5 as V1, is used to issue a control signal to the manufacturing equipment resulting in the movement of the probe along the trajectory specified by V1. (The apparent movement of the probe beyond this point of initial contact with part 28, as depicted in FIG. 3, is possible as long as the deflection of the stylus does not exceed the safe operating range, and in any event, it will be understood that distances are exaggerated in the illustrations for clarity.)

At time $t_1$, test 58 (FIG. 4) checks the operating state of probe 16. At this time, stylus 20 has moved to a new position Q1. Since it is still in contact with the part surface, the probe remains triggered, and control is transferred to block 60. Here, the move vector V1 is rotated in the clockwise direction, and a new move vector V2 (FIG. 5) is generated. This is used to issue control signals on signal path 46 (see FIG. 2) to move the probe along path V2.

At time $t_2$, test 62 (FIG. 4) is performed, and the probe status is again checked. As depicted in FIG. 5, the probe is now at position Q2—still in contact with the part surface. Control is therefore returned to block 60 where a new move vector V3 (FIG. 5) is generated by rotating V2 in the clockwise direction. New control signals are issued and probe motion continues along path V4.

At time $t_3$, the test at 62 is performed again and control returns to block 60. A new move vector V4 (FIG. 5) is created by rotating V3 in the clockwise direction and new control signals are issued.

At time $t_4$, however, when test 62 is again performed, probe stylus 20 has moved to location P2 as shown in FIG. 5 and is out of contact with the part surface. The probe is no longer triggered and control is transferred back to block 56.

Here, a new sampled data point P2 is created and stored, and a new move vector V5 is generated. In the preferred embodiment, vector V5 is selected to be parallel to the line segment from last sampled data point P1 to the current position P2. Control signals are then issued to move the probe in a counter clockwise direction with respect to the normal of the probing plane 52 along the move vector V5.

At time $t_5$, test 58 is performed. Stylus 20 is found to be at point Q4—still out of contract with the part surface, and the probe remains untriggered. Control thus passes to block 64. A new move vector V6 is defined by rotating V5 in a counter clockwise direction and the appropriate control signals are issued. The probe now moves along path V6, as shown in FIG. 5.

At time $t_6$, test 66 shows that stylus 20 (now at position Q5) (FIG. 5) is still in its non-triggered state, so block 64 generates a new move vector V7 (FIG. 5) by rotating the move vector V6 in the counter clockwise direction. Control signals are issued to the manufacturing equipment resulting in the motion along path V7 (FIG. 5).

Finally, at time $t_7$, test 66 reveals that stylus 20, now at point P3, is again in contact with the part surface. Probe 18 is thus triggered, and control moves back to block 56 where a new sample data point P3 is stored, and a new move vector parallel to the line between points P2 and P3 is generated. This cycle is repeated until the intersection of part surface 28 with probing plane 52 has been completely mapped or the operation is terminated.

To map the entire surface of part 28, provision must, of course, be made for determining when routing boundary 50 has been completely traversed, and for redefining probing plane 52. Various ways to do this are known to those skilled in the art, such as those used in conventional digital probing equipment available prior to this invention. Some of these involve moving probe stylus 20 off surface 28 while still in the X-Y plane, and offsetting the probe in the Z-direction a constant value K, but to eliminate the time lost while the probe is off of the part, it is preferred to offset the probe stylus in the Y-Z plane by the distance K while it is still in contact with part 28. The probing operation would then continue along the probing boundary in a new probing plane 52' (see FIG. 5) without interruption.

Another suitable data gathering strategy would be a spiral path starting at the base of the part, e.g., at the level of table 12 (see FIG. 1), and climbing in the Z direction until the probe no longer makes contact with the part. These, and other suitable strategies are readily achieved by conventional programming to manipulate vector W during the computations taking place in block 56.

According to the previously stated rules (1) and (2), control blocks 60 and 64 produce movement of the probe along routing boundary 50 in a clockwise direction by defining a series of move vectors such as V1 through V7 in FIG. 5, and generating corresponding control signals for the machine tool drive motors based on the X, Y and Z components of the move vectors. Selection of the values for these components may be achieved in various ways. Two methods found to be of particular utility are described in conjunction with FIGS. 6 through 8.

Figure 6:
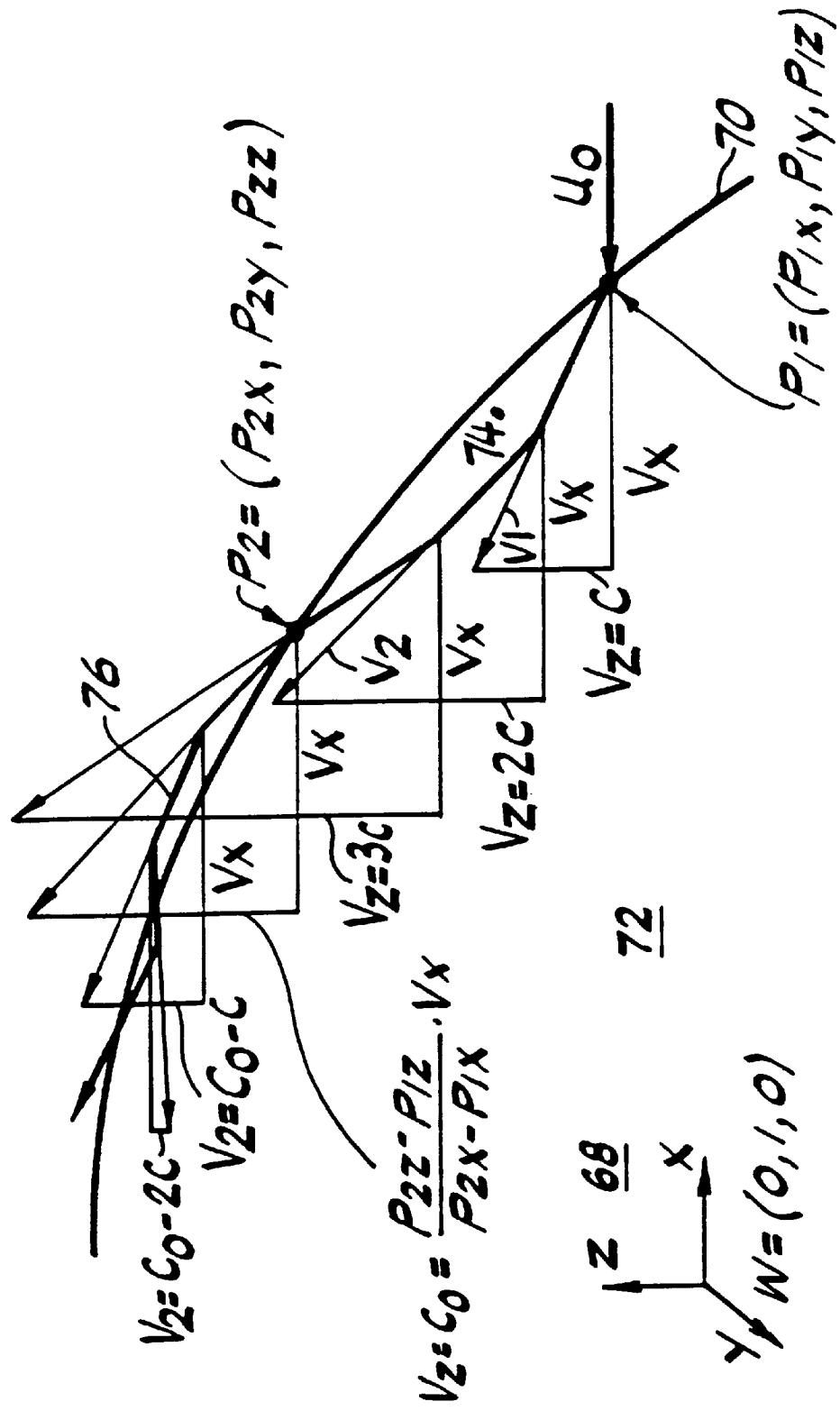
FIG. 6 illustrates the resultant trajectory of the probe using a constant addition-subtraction computation method for computing the probe trajectory.
Figure 7:
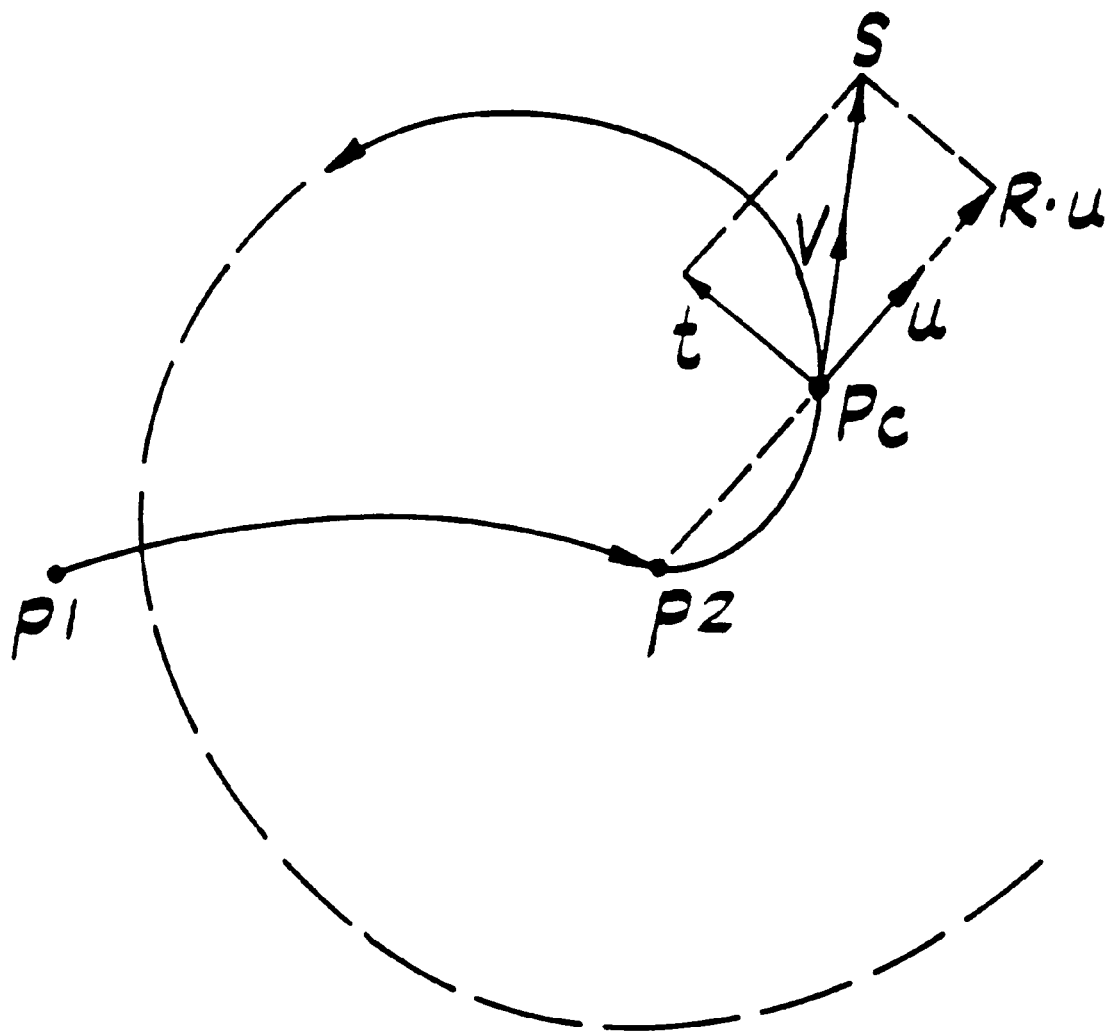
FIG. 7 illustrates the resultant trajectory of the probe using a spiral method for computing the probe trajectory.

FIG. 6 illustrates the resultant trajectory for a constant addition/subtraction model for rotating the move vector. This is particularly useful for a relatively flat unknown three dimensional surface which is lofted in the Z direction.

To illustrate this model, assume that the X-Z plane with a constant Y value is selected as an instantaneous probing plane 68. The normal vector W is defined by (0,1,0). Initially, the probe 18 is driven toward surface 70 of part 72 in plane 68 along path $U_0$ from right to left in the X-direction at constant speed $V_X$, i.e., the component of the move vector in the Z direction is zero (see FIG. 6). When stylus 20 contacts surface 70, the probe is triggered and the point of contact $P_1$ is specified as the first data point at block 54 (see FIG. 4). The first move vector $V_1$ is then generated at block 56 with the X-component maintained at its previous value $V_X$ but with Z-component $V_Z$ increased by a constant value C. (If the initial Z-component of the velocity, i.e., along path $U_0$ is assumed to be zero, for the first computation cycle, $V_Z$ would be equal to C.)

As long as tests of the probe status at successive test times $t_1$, $t_2$, etc. (see FIGS. 4 and 5) indicate that the probe is still in its triggered state, the X-components of successive move vectors remain constant and the Z-components are increased by the same constant value, i.e., from C to 2C to 3C, etc. (see FIG. 6). The result is a concave curve, or clockwise move such as illustrated by trajectory segment 74 (FIG. 6).

When the probe status changes from contact to non-contact at point P2 (see FIG. 6) the computation proceeds to block 56 (FIG. 4). Here, the move vector $V_Z$ is calculated to be parallel to the line connecting the points $P_1$ and $P_2$, with the X-component $V_{2X}$ remaining the same, and the Z-component $$V_{2z} = C_0 = \frac{P_{2z} - P_{1z}}{P_{2x} - P_{1x}} \times V_x \quad (1)$$

At block 64, if the probe stylus 20 is not in contact with the surface at the time of measurement, the X-component of the move vector is still held constant but the Z-component is decreased, again by the selected constant value, i.e. from $C_0$ to $C_0 - C$, $C_0 - 2C$ . . . until the probe is triggered. The probe trajectory then becomes convex as illustrated by trajectory segments 76.

A simplified version of the approach detailed above would be to set $V_Z$ equal to a positive constant $K_0$ when the probe is triggered, and equal to $-K_0$ when the probe is not triggered. Other variations are also possible.

In general, the feed rate of the machine which determines the velocity of the probe must be such that in one computation cycle the probe can not travel beyond its safe operating range. The actual numbers depend on the duration of the computation cycle and the safe operating range for the particular probe being used. For the exemplary installation described above using a Renishaw MP11 probe, for a model using constant X-direction speed of 2 inches per minute, constant $C_0$ can vary from 0.1 to 0.5 inches per minute. In general, the computation cycles (under 0.02 sec. for the installation described) are short enough that processor speed is not a factor.

Furthermore, in the preferred embodiment, if the probe is signaling its triggered state, it is possible to include in the computation algorithm, a comparison of the current probe position with the last sampled data point to ensure that the probe will not exceed its safe operating range between successive computation cycles. To implement this feature, if the comparison indicates that the probe is near the limit of its safe operating range, the X-component of the move vector, $V_X$, is held at zero until the probe is no longer triggered. This may readily be incorporated into the computations performed at blocks 60 and 64 in FIG. 4.

A more sophisticated implementation for rotating the move vector in either the clockwise or counterclockwise direction is depicted in FIG. 8. Under this implementation the resulting trajectory drives the probe spirally about the last sampled data point. In FIG. 8, the unit normal W of the instantaneous probing plane is perpendicular to and pointing out of the figure (not shown); u represents the unit vector whose orientation is parallel to the vector passing through the last sampled data point P2 and the current position $P_C$. An instantaneous orthogonal coordinate frame u, t, W may be determined by selecting t to be the cross product of W and u. Rotation of the move vector V along a spiral trajectory may be realized with the assistance of the spiral ratio R. The spiral ratio is calculated as follows:

$$R = C - \frac{d(1 + C)}{sd} \quad (2)$$

where C is an adjustable constant which can be determined through experimentation for each system (it is set at 15 in the preferred embodiment), sd represents the safe operating distance of the probe and d is the distance between current position PC and the last sampled point P2. In the preferred embodiment, as d varies from 0 to sd the spiral ratio R changes from 15 to −1. For a counterclockwise spiral trajectory, the move vector V can be computed with the assistance of the spiral vector S as follows:

$$S = R \times u + t \qquad (3)$$

and $$V = M \times \frac{S}{|S|} \qquad (4)$$

where |S| is the length of the spiral vector. The move vector V is selected to be parallel to S with a magnitude of M equal to the desired feedrate. To generate a clockwise spiral trajectory, equation (2) is replaced by:

$$S = R \times u - t \qquad (3')$$

This implementation guarantees that the probe will never go beyond the safe operating distance sd. FIG. 8 shows the resulting counterclockwise spiral trajectory.

Several options within the scope of this invention have been described for generating the move vectors. It will be obvious to one skilled in the art that other computation algorithms are possible as well. It will also be apparent that the magnitude of the move vector (i.e., the selected feedrate) may vary dynamically along with the change in the direction of the move vector.

In general, it is preferred that one computation algorithm be employed for the duration of a probing operation, but it is possible to provide the option for selection of one computation algorithm from among several including within the programming.

Programming for implementation of the computations may be done in any conventional manner, and will be apparent to one skilled in the art, so a description is omitted in the interest of brevity.

Other variations within the scope of the invention will also be apparent to one skilled in the art, it being understood that the scope of the invention is defined in the claims which follow.

What is claimed is:

1. A method of routing a digital probe around the surface of an object, the probe being capable of signaling a triggered operating state when it is within a predetermined distance from the surface of the object and a non-triggered operating state otherwise, the probe being mounted on a machine which is capable of responding to control signals to produce relative movement between the probe and the object, the method comprising the steps of:
   (1) detecting the operating state of the probe;
   (2) generating a control signal to vary the movement of the probe relative to the object based on the operating state of the probe;
      (a) the control signal being such that the probe will be in continuous motion relative to the object even when the probe is in its triggered operating state;
      (b) the control signal further being such that the motion of the probe will be in a direction which (i) will cause it to be triggered if it is in the untriggered state, and (ii) which will cause it to return to the untriggered state if it is in the triggered state; and
   (3) moving the probe relative to the object according to the control signal.

2. A method according to claim 1 in which the control signal is generated to define the desired velocity of the probe.

3. A method according to claim 1, in which the machine is capable of signalling the position of the probe relative to the object; and further including the steps of:
   (1) detecting the position of the probe relative to the object;
   (2) generating the control signal such that it is dependent on the position of the probe relative to the object as well as on the operating state of the probe.

4. A method according to claim 3, further including the steps of:
   (1) detecting a change in the operating state of the probe;
   (2) identifying the position of probe at each change of the operating state of the probe as a data point.

5. A method according to claim 1, further including the steps of:
   (1) establishing a plane which intersects the object as an instantaneous probing plane;
   (2) generating the control signal such that
      (a) the movement of the probe will be substantially exclusively in the probing plane and
      (b) further such that the motion of the probe
         (i) will be predominantly in a first angular direction relative to a vector normal to the probing plane if the probe is in its non-triggered state; and
         (ii) predominantly in the opposite angular direction relative to the vector normal to the probing plane if the probe is in its triggered state.

6. A method according to claim 5 in which
   (1) the direction of the motion of the probe is counterclockwise relative to the line normal to the probing plane when the probe is in its non-triggered state, and
   (2) clockwise relative to the line normal to the probing plane when the probe is in its triggered state.

7. A method according to claim 5 in which the control signal is generated to define the desired velocity of the probe in the plane.

8. A method according to claim 1 in which the probe is triggered by contact with the surface of the object, and further including the step of:
   (1) limiting further motion of the probe to a predetermined safe distance if the probe is triggered.

9. A method of routing a digital probe around the surface of an object, the probe being capable of signaling a triggered operating state when it is within a predetermined distance from the object surface and a non-triggered operating state otherwise, the probe being mounted on a machine which is capable of responding to control signals to produce relative movement between the probe and the object, and further capable of signalling the position of the probe relative to the object; the method comprising the steps of:
   (1) detecting the non-triggered or triggered operating state of the probe at a succession of computation times;
   (2) detecting the position of the probe relative to the object at each computation time;
   (3) generating a control signal at each computation time to vary the movement of the probe relative to the object based on the position of the probe relative to the object at the computation time and on the operating state of the probe at that computation time;
   (4) the control signal further being such that
      (a) the probe will be in continuous motion relative to the object even when the probe is in its triggered operating state, and (b) such that the motion of the probe will tend to be in a direction
   (i) which will cause the probe to be triggered if it was in the untriggered state at the computation time, and
   (ii) which will cause it to return to the untriggered state if it was triggered at the computation time; and
(5) moving the probe relative to the object according to the control signal generated at one computation time during the interval until the next computation time.

10. A method according to claim 9 in which the control signal is generated to define the desired velocity of the probe.

11. A method according to claim 9, further including the steps of:
   (1) establishing a plane which intersects the object as an instantaneous probing plane;
   (2) generating the control signal such that the movement of the probe will be in the probing plane and
   (3) further such that the motion of the probe
      (a) will be predominantly in a first angular direction relative to a vector normal to the probing plane if the probe is in its non-triggered state at the computation time, and
      (b) predominantly in the opposite angular direction relative to the vector normal to the probing plane if the probe is in its triggered state at the computation time.

12. A method according to claim 11 in which
   (1) the change of direction of the motion of the probe is counter-clockwise relative to the line normal to the probing plane when the probe is in its non-triggered state, and
   (2) clockwise relative to the line normal to the probing plane when the probe is in its triggered state.

13. A method according to claim 11, further comprising the steps of:
   (1) comparing the operating state of the probe at successive computation times; and
   (2) identifying the position of the probe at a particular computation time as a data point only if there has been an change of the probe's operating state since the previous computation time.

14. A method according to claim 13, further comprising a step of:
   (1) recording the series of data points obtained as a representation of the surface of the object.

15. A method according to claim 13, in which the step of generating the control signals comprises the additional step of: (1) utilizing the previously identified data point and the instantaneous position of the probe at a particular computation time to define the trajectory of the probe until the next computation time.

16. A method according to claim 15 further including, after at least one computation time, the step of:
   (1) selecting a new instantaneous probing plane.

17. A method according to claim 9 in which the probe is triggered by contact with the surface of the object, and further including the step of:
   (1) limiting additional motion of the probe to a predetermined safe distance, if the probe is triggered.

18. A method according to claim 9 further comprising the steps of:
   (1) comparing the operating state of the probe at successive computation times; and
   (2) identifying the position of the probe at a particular computation time as a data point only if there has been an change of the operating state of the probe since the previous computation time.

19. A method according to claim 18 further comprising a step of:
   (1) recording the series of data points obtained as a representation of the surface of the object.

20. A method according to claim 18 in which the step of generating the control signals comprises the additional step of:
   (1) utilizing the previously identified data point and the instantaneous position of the probe at a particular computation time to define the trajectory of the probe until the next computation time.

21. A method according to claim 18, in which:
   (1) the control signal is such that it tends to cause the probe to move in a spiral path around the previously identified data point.

22. A method according to claim 9, in which the step of generating the control signal further includes the steps of:
   (1) generating a first component in a direction which causes the probe to be triggered and having a magnitude equal to a first constant value, and
   (2) generating a second component in a direction orthogonal to the direction of the first component, the second component
      (a) having a magnitude equal to a second constant value when the probe is triggered at a particular computation time, and
      (b) a magnitude equal to the negative value of the second constant when the probe is untriggered at a particular computation time.

23. A method according to claim 9, in which the step of generating the control signal further includes the steps of:
   (1) generating a first component in a direction which causes the probe to be triggered, and having a magnitude equal to a first constant value,
   (2) generating a second component in a direction orthogonal to the direction of the first component,
   (3) increasing the magnitude of the second component by a second constant value when the probe is triggered at a particular computation time, and
   (4) decreasing the magnitude of the second component by the negative value of the second constant when the probe is untriggered at a particular computation time.

24. A method according to claim 18 in which the step of generating control signals further comprises the step of:
   (1) determining the difference between the position of the probe at a particular computation time and the position of the previous data point, and, if the difference exceeds a predetermined safe value,
      (a) preventing the difference from increasing further, thereby keeping the probe within a safe operating range.

25. A method according to claim 9 in which the probe is triggered by contact with the surface of the object, and further including the step of:
   (1) permitting the motion of the probe to continue by only a predetermined additional distance, after the probe is triggered.

26. A method according to claim 9 further including, before initiating a succession of computation times, the step of:
   (1) moving the probe toward the object until it is triggered, and thereafter, initiating the first computation time.

27. A method according to claim 26 in which:
(1) the step of moving the probe toward the object until it is triggered is performed by manually manipulating controls for the machine.

28. Apparatus for routing a digital probe around the surface of an object, the probe being capable of signaling a triggered operating state when it is within a predetermined distance from the surface of the object and a non-triggered operating state otherwise, the probe being mounted on a machine which is capable of responding to control signals to produce relative movement between the probe and the object, the apparatus comprising:
(1) means for detecting the operating state of the probe;
(2) means responsive to the operating state of the probe for generating a control signal to move the probe relative to the object continuously, irrespective of the operating state of the probe;
(3) the control signal generating means including:
  (a) means responsive to the probe being in the untriggered state to generate a control signal which will cause the probe to be triggered, and
  (b) means responsive to the probe being in the triggered state to generate a control signal which will cause the probe to be returned to the untriggered state; and
(4) means for coupling the control signal to the machine.

29. Apparatus according to claim 28, in which the machine is capable of generating signals representing the position of the probe relative to the part; and in which the control signal generating means includes:
(1) means responsive to the probe position signals for generating a component of the control signal which is dependent on the position of the probe relative to the object.

30. Apparatus for according to claim 28 in which the control signal is representative of the desired velocity of the probe.

31. Apparatus for according to claim 28, further including:
(1) means for establishing a plane which intersects the object as an instantaneous probing plane; and in which
(2) the control signal generating means includes:
  (a) means for generating a first control signal for moving the probe substantially exclusively in the probing plane and predominantly in a first angular direction relative to a vector normal to the probing plane if the probe is in its non-triggered state;
  (b) means for generating a second control signal for moving the probe substantially exclusively in the probing plane and predominantly in the opposite angular direction relative to the vector normal to the probing plane if the probe is in its triggered state.

32. Apparatus for according to claim 31 in which:
(1) the first direction is counter-clockwise relative to the line normal to the probing plane and in which:
(2) the second direction is clockwise relative to the line normal to the probing plane.

33. Apparatus for according to claim 32 in which:
(1) the first and second control signals represent the desired velocity of the probe in the probing plane.

34. Apparatus for routing a digital probe around the surface of an object, the probe being capable of signaling a triggered operating state when it is within a predetermined distance from the object surface and a non-triggered operating state otherwise, the probe being mounted on a machine which is capable of responding to control signals to produce relative movement between the probe and the object, and further capable of signalling the position of the probe relative to the object; the apparatus comprising:
(1) means for detecting the operating state of the probe at a succession of computation times;
(2) means for detecting the position of the probe relative to the object at each computation time;
(3) means responsive to the operating state of the probe and the position of the probe for generating a control signal to maintain the probe constantly in motion irrespective of the operating state of the probe;
  (a) the control signal generating means further including:
    (i) means responsive to the probe being in its untriggered state at a particular computation time to generate a control signal which will tend to cause the probe to be triggered, and
    (ii) means responsive to the probe being in the triggered state at the computation time, to generate a control signal which will tend to cause the probe to return to the untriggered state; and
(4) means for coupling the control signals to the machine.

35. Apparatus for according to claim 34 in which the control signal generating means includes means to generate the control signal to be representative of the desired velocity of the probe.

36. Apparatus according to claim 34, further including:
(1) means for establishing a plane which intersects the object as an instantaneous probing plane; and in which
(2) the control signal generating means includes:
  (a) means for generating a first control signal
    (i) for moving the probe substantially exclusively in the probing plane and
    (ii) predominantly in a first angular direction relative to a vector normal to the probing plane if the probe is in its non-triggered state at a particular computation time; and
  (b) means for generating a second control signal
    (i) for moving the probe substantially exclusively in the probing plane and
    (ii) predominantly in the opposite angular direction relative to the vector normal to the probing plane if the probe is in its triggered state at the particular computation time.

37. Apparatus according to claim 36 in which:
(a) the first direction is counter-clockwise relative to the line normal to the probing plane, and in which
(b) the second direction is clockwise relative to the line normal to the probing plane when the probe.

38. Apparatus according to claim 36, further comprising:
(1) means for comparing the operating state of the probe at successive computation times; and
(2) means for identifying the position of the probe at a particular computation time as a data point only if there has been an change of the probe's operating state since the previous computation time.

39. Apparatus according to claim 38, further comprising:
(1) means for recording the series of data points obtained as a representation of the surface of the object.

40. Apparatus for according to claim 38, in which the control signal generating means includes:
(1) means responsive to the previously identified data point and the instantaneous position of the probe at a particular computation time to define the trajectory of the probe until the next computation time.

41. Apparatus according to claim 36 further including means for selecting a new instantaneous probing plane.

42. Apparatus according to claim 34 further comprising:
 (1) means for comparing the operating state of the probe at successive computation times; and
 (2) means for identifying the position of the probe at a particular computation time as a data point only if there has been an change of the probe's operating state since the previous computation time.

43. Apparatus according to claim 42 further comprising:
 (1) means for recording the series of data points obtained as a representation of the surface of the object.

44. Apparatus according to claim 42 in which the control signal generating means includes means responsive to the previously identified data point and the instantaneous position of the probe at a particular computation time to define the trajectory of the probe until the next computation time.

45. Apparatus according to claim 42, in which the control signal generating means includes means to generate the control signal such that it tends to cause the probe to move in a spiral path around the previously identified data point.

46. Apparatus according to claim 42 in which the control signal generating means further comprises:
 (1) means for determining the difference between the position of the probe at a particular computation time and the position of the last data point, and
 (2) means responsive to the difference exceeding a predetermined safe value, for modifying the first control signal component to prevent the difference from increasing further, thereby keeping the probe within its safe operating range.

47. Apparatus according to claim 34 further including:
 (1) means for moving the probe toward the object until it is triggered, and
 (2) means for initiating a first computation time occurs once the probe has been triggered.

48. Apparatus according to claim 47 in which the means for moving the probe toward the object until it is triggered is a manual input device for the machine.

49. Apparatus according to claim 34 in which the control signal generating means includes:
 (1) means for generating a first control signal component
  (a) to move the probe in a direction which will cause it to be triggered and
  (b) having a magnitude equal to a first constant value, and
 (2) means for generating a second control signal component to move the probe in a direction which is orthogonal to the first control signal component; the means for generating the second control signal component including:
  (a) means for generating a signal which is equal in magnitude to a second constant value when the probe is triggered at a particular computation time, and
  (b) equal to the negative value of the second constant when the probe is untriggered at a particular computation time.

50. Apparatus according to claim 34, in which the means for generating the control signal further includes:
 (1) means for generating a first component
  (a) for moving the probe in a direction which causes the probe to be triggered, and
  (b) having a magnitude equal to a first constant value,
 (2) means for generating a second component in a direction orthogonal to the direction of the first component,
 (3) means for increasing the magnitude of the second component by a second constant value when the probe is triggered at a particular computation time, and
 (4) means for decreasing the magnitude of the second component by the negative value of the second constant when the probe is untriggered at a particular computation time.

* * * * *